(12) United States Patent
Gulwani et al.

(10) Patent No.: US 9,031,894 B2
(45) Date of Patent: May 12, 2015

(54) PARSING AND RENDERING STRUCTURED IMAGES

(71) Applicant: Microsoft Corporation, Redmond, WA (US)

(72) Inventors: Sumit Gulwani, Bellevue, WA (US); Oleksandr Polozov, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 261 days.

(21) Appl. No.: 13/769,838

(22) Filed: Feb. 19, 2013

(65) Prior Publication Data

US 2014/0236991 A1    Aug. 21, 2014

(51) Int. Cl.
*G06F 17/00* (2006.01)
*G06N 5/02* (2006.01)
*G06F 17/30* (2006.01)
*G06K 9/00* (2006.01)

(52) U.S. Cl.
CPC ...... *G06F 17/30247* (2013.01); *G06K 9/00449* (2013.01)

(58) Field of Classification Search
USPC .......................................................... 706/47
See application file for complete search history.

(56) References Cited

U.S. PATENT DOCUMENTS

| | | | |
|---|---|---|---|
| 6,557,017 B1 | 4/2003 | Venable | |
| 8,060,880 B2 * | 11/2011 | Cherem et al. | 718/102 |
| 8,181,163 B2 * | 5/2012 | Jojic et al. | 717/135 |
| 8,195,582 B2 * | 6/2012 | Niemasik et al. | 706/12 |
| 8,266,598 B2 * | 9/2012 | Gulwani et al. | 717/130 |
| 8,271,404 B2 * | 9/2012 | Gulwani et al. | 706/12 |
| 8,285,667 B2 * | 10/2012 | Jaros et al. | 706/60 |
| 8,316,345 B2 * | 11/2012 | Gulwani et al. | 717/104 |
| 8,397,221 B2 * | 3/2013 | Gulwani et al. | 717/143 |
| 8,402,439 B2 * | 3/2013 | Gulwani et al. | 717/126 |
| 8,484,550 B2 * | 7/2013 | Gulwani et al. | 715/217 |
| 8,504,570 B2 * | 8/2013 | Hawkins et al. | 707/737 |
| 8,645,291 B2 * | 2/2014 | Hawkins et al. | 706/12 |
| 8,650,207 B2 * | 2/2014 | Gulwani et al. | 707/769 |

(Continued)

FOREIGN PATENT DOCUMENTS

EP    1883037 A2    1/2008

OTHER PUBLICATIONS

Fast adaptive upscaling of low structured images using a hierarchical filling strategy Askar, S. ; Kauff, P. ; Brandenburg, N. ; Schreer, O. Video/Image Processing and Multimedia Communications 4th EURASIP-IEEE Region 8 International Symposium on VIPromCom DOI: 10.1109/VIPROM.2002.1026671 Publication Year: 2002 , pp. 289-293.*

(Continued)

*Primary Examiner* — Michael B Holmes
(74) *Attorney, Agent, or Firm* — Micah Goldsmith; Peter Taylor; Micky Minhas

(57) ABSTRACT

Systems and methods for generating a tuple of structured data files are described herein. In one example, a method includes detecting an expression that describes a structure of a structured image using a constructor. The method can also include using an inference-rule based search strategy to identify a hierarchical arrangement of bounding boxes in the structured image that match the expression. Furthermore, the method can include generating a first tuple of structured data files based on the identified hierarchical arrangement of bounding boxes in the structured image.

20 Claims, 8 Drawing Sheets

(56) References Cited

U.S. PATENT DOCUMENTS

| | | | |
|---|---|---|---|
| 8,719,801 B2* | 5/2014 | Gulwani et al. | 717/132 |
| 8,752,029 B2* | 6/2014 | Gulwani et al. | 717/131 |
| 8,799,234 B2* | 8/2014 | Gulwani et al. | 707/687 |
| 8,825,565 B2* | 9/2014 | Marianetti et al. | 706/12 |
| 8,825,572 B2* | 9/2014 | Nori et al. | 706/13 |
| 2007/0003147 A1 | 1/2007 | Viola et al. | |
| 2008/0298667 A1 | 12/2008 | Lassahn et al. | |
| 2012/0133664 A1 | 5/2012 | Zhu et al. | |
| 2012/0163719 A1 | 6/2012 | Anisimovich et al. | |

OTHER PUBLICATIONS

Uncertainty reasoning based on filter of lattice implication algebra Jun Ma ; Yang Xu ; Li, T.R. ; Li, W.J. Systems, Man and Cybernetics, 2003. IEEE International Conference on vol. 5 DOI: 10.1109/ICSMC.2003.1245772 Publication Year: 2003 , pp. 4980-4985 vol.*

Supervised segmentation of remote sensing images based on a tree-structured MRF model Poggi, G. ; Scarpa, G. ; Zerubia, J.B. Geoscience and Remote Sensing, IEEE Transactions on vol. 43 , Issue: 8 DOI: 10.1109/TGRS.2005.852163 Publication Year: 2005 , pp. 1901-1911.*

Zhu, et al., "A Stochastic Grammar of Images", Retrieved at <<http://www.stat.ucla.edu/~sczhu/papers/Reprint_Grammar.pdf>>, Jul. 26, 2012, pp. 104.

Yao, et al., "Image Parsing to Text Description", Retrieved at <<http://ieeexplore.ieee.org/stamp/stamp.jsp?tp=&amumber=5487377>>,In the proceedings of the IEEE, Aug. 2010, pp. 24.

Han, et al., "Bottom-Up/Top-Down Image Parsing with Attribute Grammar", Retrieved at <<http://www.stat.ucla.edu/~sczhu/papers/PAMI_Grammar_rectangle.pdf>>, In the proceedings of Pattern Analysis and Machine Intelligence, Jan. 2009, pp. 35.

"International Search Report & Written Opinion for PCT Patent Application No. PCT/US2014/016335", Mailed Date: Jun. 6, 2014, Filed Date: Feb. 14, 2014, 8 Pages. (MS# 337762.02).

Couasnon, Bertrand, "DMOS, A Generic Document Recognition Method: Application to Table Structure Analysis in a General and in a Specific Way", In International Journal of Document Analysis and Recognition, vol. 8, No. 2, Mar. 24, 2006, pp. 111-122.

* cited by examiner

200

| TOURISTS TO AUSTRALIA (2006) | | |
|---|---|---|
| COUNTRY OF ORIGIN OF VISITORS | NUMBER OF VISITORS | AVERAGE LENGTH OF STAY (NIGHTS) |
| ITALY | 51 737 | 42 |
| CHINA | 308 452 | 48 |
| UNITED STATES OF AMERICA | 456 084 | 24 |
| UNITED KINGDOM | 734 244 | 34 |
| CANADA | 109 843 | 42 |
| NEW ZEALAND | 1 075 797 | 14 |

FIG. 5

606 — TD-RECT-INCOMPLETE
$$\frac{D \text{ is incomplete} \quad \exists \text{contour } c \approx_{\delta} b \text{ s.t. } \text{Box}(c) \text{ matches } D}{\text{TDMatch}(\text{Elem}(D, \text{Rectangle}), b) = \text{Fill}(D, \text{Box}(c), \emptyset)}$$

608 — TD-RECT-COMPLETE
$$\frac{D \text{ is complete}}{\text{TDMatch}(\text{Elem}(D, \text{Rectangle}), b) = \text{Fill}(D, b, \emptyset)} \longleftarrow 604$$

616 — TD-SEQ-RANGE
$$\frac{\exists k \in \{k_1, k_2\} \; \forall j \in \{1..k\} : \text{TDMatch}(E, \text{Partition}(b, O, k, j)) = T_j}{\text{TDMatch}(\text{Elem}(D, \text{Seq}(O, \text{Range}(k_1, k_2), E)), b) = \text{Fill}(D, b, \bigcup_{j=1}^{k} T_j)}$$

626 — TD-SEQ-CONST
$$\frac{\text{TDMatch}(\text{Elem}(D, \text{Seq}(O, \text{Range}(k, k), E)), b) = T}{\text{TDMatch}(\text{Elem}(D, \text{Seq}(O, \text{Const}(k), E)), b) = T}$$

622 — TD-UNION
$$\frac{\exists j \in \{1..m\} : E_j = \text{Elem}(D_j, E') \wedge \text{TDMatch}(E_j, b) = T_j}{\text{TDMatch}(\text{Elem}(D, \text{Choice}(E_1, \ldots, E_m)), b) = \text{Fill}(D \cup D_j, b, T_j)}$$

620 — BU-SEQ-UNKNOWN
$$\frac{\text{Fact}(E, b, T) \in M}{\ldots}$$

624 — BU-UNION
$$\frac{\text{Fact}(E_j, b, T) \in M \quad E_j \in \{E_1, \ldots, E_m\}}{\text{Fact}(\text{Elem}(D, \text{Choice}(E_1, \ldots, E_m)), b, \text{Fill}(D, b, T_j))}$$

618 — $$\text{Fact}\left(\text{Elem}(D, \text{Seq}(O, C, E)), \bigcup_{j=1}^{r-1} \text{Neighbor}(b, O, j), T\right) = ((f, r) \vee_{j=r} \text{Neighbor}(b, O, j) : \text{TDMatch}(E, \text{Neighbor}(b, O, j) \vee \text{Fill}(D, \bigcup_{j=1}^{r} \text{Neighbor}(b, O, j)))$$

614 — TD-SYMBOL-DEPEND
$$\frac{(s_i, E_i) \text{ is a symbol} \quad \exists r, C, b : \text{TDMatch}(E_i, \text{Rel}(E_i, \{E_j \mid E_i = E_j\})) = T_2}{\text{TDMatch}(s_i, E_i), \text{Rel}(E_i, \{E_j \mid E_i = E_j\})) = T_3}$$

602 — TD-CACHED
$$\frac{\text{Fact}(E, b, T) \in M}{\text{TDMatch}(E, b) = T}$$

612 — TD-SYMBOL-CONTOUR
$$\frac{(s_i, E_i) \text{ is a symbol} \quad \exists c, b : \text{TDMatch}(E_i, \text{Box}(c)) = T_1}{\text{TDMatch}((s_i, E_i), b) = T_3}$$

610 — TD-STRUCT
$$\frac{\forall i \in \{1..m\} \; \exists b_i : \text{TDMatch}((s_1, E_1), \ldots, (s_m, E_m)), \text{Box}\left(\bigcup_{j=1}^{m} b_j\right) = \text{Fill}(D, b, T_i)}{\text{TDMatch}\left(\text{Elem}(D, \text{Struct}((s_1, E_1), \ldots, (s_m, E_m))), \text{Box}\left(\bigcup_{j=1}^{m} b_j\right)\right) = \text{Fill}(D, b, T_i)}$$

PARSING AND RENDERING STRUCTURED IMAGES

BACKGROUND

Many software editing applications enable the modification of existing images. Some of the software editing applications may apply signal processing algorithms to natural images to identify objects in the existing images. However, signal processing algorithms may not accurately parse some images.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment provides a method for generating a tuple of structured data files that includes detecting an expression that describes a structure of a structured image. The method also includes using an inference-rule based search strategy to identify a hierarchical arrangement of bounding boxes in the structured image that match the expression. Additionally, the method includes generating a first tuple of structured data files based on the identified hierarchical arrangement of bounding boxes in the structured image.

Another embodiment provides one or more computer-readable storage media comprising a plurality of instructions for generating a tuple of structured data files. The instructions cause a processor to detect an expression that describes a structure of a structured image using a constructor. The instructions also cause a processor to use an inference-rule based search strategy to identify a hierarchical arrangement of bounding boxes in the structured image that match the expression. Additionally, the instructions cause a processor to generate a first tuple of structured data files based on the identified hierarchical arrangement of bounding boxes in the structured image, wherein the first tuple of structured data files comprises a first data file of content values and a second data file of style characteristic related to the content values.

Another embodiment provides a system for generating a tuple of structured data files comprising a processor to execute processor executable code, and a storage device that stores processor executable code. The processor executable code causes the processor to detect an expression that describes a structure of a structured image using a constructor. The processor executable code also causes the processor to use an inference-rule based search strategy to identify a hierarchical arrangement of bounding boxes in the structured image that match the expression. Furthermore, the processor executable code causes the processor to generate a first tuple of structured data files based on the identified hierarchical arrangement of bounding boxes in the structured image, wherein the first tuple of structured data files comprises a first data file of content values and a second data file of style characteristic related to the content values.

BRIEF DESCRIPTION OF THE DRAWINGS

The following detailed description may be better understood by referencing the accompanying drawings, which contain specific examples of numerous features of the disclosed subject matter.

FIG. 5 is an example chart that can be described with a programming language that manipulates structured images;

FIG. 6 illustrates an example of top-down inference rules and bottom-up inference rules;

DETAILED DESCRIPTION

Various methods for manipulating structured images are described herein. A structured image, as referred to herein, can include any image with pixels that has a hierarchical or repetitive structure. In some embodiments, a structured image is a two-dimensional array of pixels, where each pixel represents a particular color. In some examples, the structured images can include a connect-4 game board, a bead design, a Japanese crossword, checker game board, a math worksheet, a puzzle board, a scrabble board, a bar chart, or a data table, among others.

In one embodiment, a programming language enables various applications to implement data extraction, image editing, and image creation, among others. Data extraction, as referred to herein, can include using an expression to represent an image as a tuple of structured data. In some embodiments, the tuple of structured data can represent properties or characteristics, such as color, shape, or size, among others, of each pixel of a structured image. An expression, as referred to herein, can include any suitable number of properties that describe a particular region or a pixel of a structured image. In some embodiments, image editing can include using an expression to parse a structured image into a tuple of structured data or to render a structured image from a tuple of structured data. In some embodiments, image editing can also include modifying a tuple of structured data that represents a structured image using additional tuples of structured data or additional expressions, among others. The image creation, as referred to herein, can include any suitable number of expressions or any suitable tuples of structured data that can be combined to render a new image.

In some embodiments, a programming language, such as a domain specific language, among others, can enable expressing the hierarchical structure of a structured image as an expression using standard sequence, structure, and union type constructors. In some embodiments, the programming language can be a bi-directional language that supports operations for parsing a structured image into data files and for rendering data files into a structured image. In some examples, a parsing operation can be based on inference rules and a dynamic programming based search strategy. In one example, the parsing operation can include finding any suitable hierarchical decomposition of a structured image based on rectangular regions. For example, the parsing operation can search for the rectangular regions using contours provided by an underlying contour detection algorithm. The parsing operation can also use a combination of top-down and bottom-up inference rules to detect missing contours in a structured image.

Figure 1:
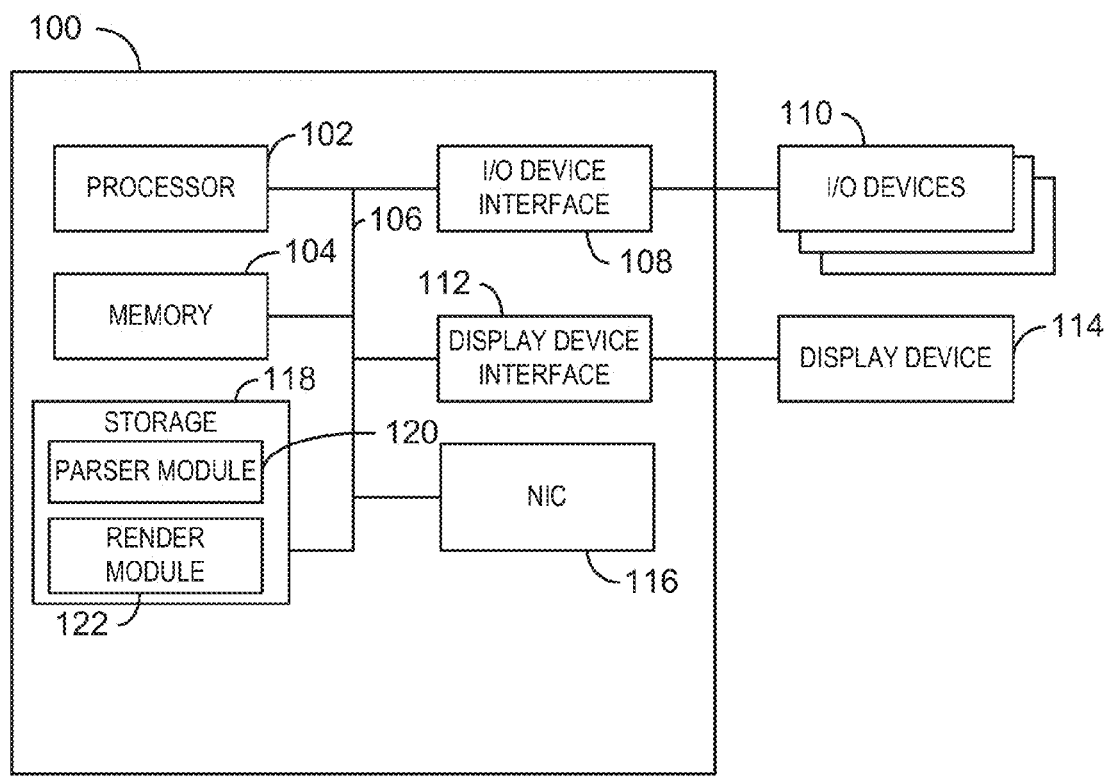
FIG. 1 is a block diagram of an example of a computing system that can parse and render a structured image based on an expression.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can parse or render a structured image based on an expression. The computing system 100 may be, for example, a mobile phone, laptop computer, desktop computer, or tablet computer, among others. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions that are executed by the processor 102 may be used to parse and render a structured image.

The processor 102 may be connected through a system bus 106 (e.g., PCI, ISA, PCI-Express, HyperTransport®, NuBus, etc.) to an input/output (I/O) device interface 108 adapted to connect the computing system 100 to one or more I/O devices 110. The I/O devices 110 may include, for example, a keyboard, a gesture recognition input device, a voice recognition device, and a pointing device, wherein the pointing device may include a touchpad or a touchscreen, among others. The I/O devices 110 may be built-in components of the computing system 100, or may be devices that are externally connected to the computing system 100.

The processor 102 may also be linked through the system bus 106 to a display device interface 112 adapted to connect the computing system 100 to a display device 114. The display device 114 may include a display screen that is a built-in component of the computing system 100. The display device 114 may also include a computer monitor, television, or projector, among others, that is externally connected to the computing system 100. A network interface card (NIC) 116 may also be adapted to connect the computing system 100 through the system bus 106 to a network (not depicted).

The storage 118 can include a hard drive, an optical drive, a USB flash drive, an array of drives, or any combinations thereof. The storage 118 may include a parser module 120 and a render module 122. The parser module 120 can identify any suitable number of bounding boxes in a structured image and identify a hierarchical structure for the bounding boxes. In some embodiments, the parser module 120 can also identify elements or regions of a structured image within the bounding box that match an expression. In some examples, a bounding box can represent a border around a region of a structured image. For example, a mosaic tile may include several regions which have a boundary that is indicated by a particular color. An element can refer to a particular cell or pixel of an image with a particular color or value, among others. In some examples, a structured image can be represented by an expression that can identify elements within a structured image. An example of an expression is discussed in greater detail below in relation to FIG. 5. In one example, a structured image can be represented by an expression tree that can include any suitable number of expressions.

In some embodiments, the parser 120 can also generate a tuple of data files with data values for any suitable number of elements from a structured image. For example, a data file may indicate the color of each pixel of a structured image or a value associated with each pixel of a structured image. An example of generating a data file is discussed in greater detail below in relation to FIG. 2.

A render module 122 can accept a tuple of data files as input and produce a structured image. In some embodiments, the data files can include values for any suitable number of elements of a structured image, or the data files may include style characteristics for the elements of a structured image. For example, the data files may indicate the space between pixels in a structured image, a width of a border between particular elements in a structured image, or Cartesian coordinates for a pixel that indicate the location of a pixel in a plane of any suitable number of dimensions, among others. In some embodiments, the render module 122 can also generate structured images based on modified data files, modified expressions, and multiple data files. Examples of generating a structured image with a render module 122 are discussed in greater detail below in relation to FIGS. 3-6.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional applications, additional modules, additional memory devices, additional network interfaces, etc.). Furthermore, any of the functionalities of the parser module 120 or the render module 122 may be partially, or entirely, implemented in hardware and/or in the processor 102. For example, the functionality may be implemented with an application specific integrated circuit, in logic implemented in the processor 102, or in any other device.

Figure 2:
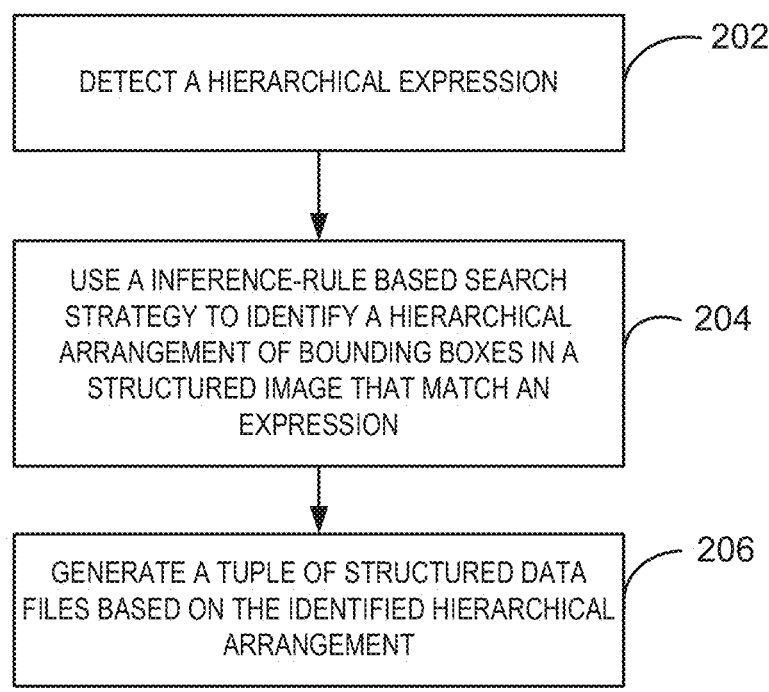
FIG. 2 is a process flow diagram of an example method for generating a data file.

FIG. 2 is a process flow diagram of an example method for generating a data file. The method 200 can be implemented with any computing device, such as the computing device 100 of FIG. 1.

At block 202, a parser module 120 can detect a hierarchical expression, also referred to herein as an expression, that describes the hierarchical arrangement of a structured image. The expression can be used to parse the image into a tuple of structured data files. In some embodiments, parsing a structured image can include identifying a hierarchical arrangement of bounding boxes that matches an expression tree. An expression tree, as referred to herein, can include a union, a struct, a sequence, or a leaf node, among others. As discussed above, a bounding box can include any suitable region of a structured image. A region, as referred to herein, can include any suitable number of cells or pixels of a structured image. In some embodiments, a parser module 120 can identify a bounding box based on contours in the structured image. A contour, as described herein, refers to a closed polyline formed by the edge of a region. For example, the contour may indicate a rectangular boundary around a region within a structured image, wherein the cells or pixels of the rectangular boundary share the same color, or value. In some embodiments, an image processing technique such as, contour detection, among others may be used to identify contours in a structured image. Contour detection is a method of recognizing closed regions with notable edges from a structured image. In some embodiments, the parser module 120 can match an expression against each contour in a structured image.

At block 204, the parser module 120 can use an inference-rule based search strategy to identify a hierarchical arrangement of bounding boxes in a structured image that match an expression. The inference-rule based search strategy can enable the parser module 120 to detect hierarchical relationships in a structured image between any suitable number of bounding boxes. In some embodiments, the parser module 120 can identify bounding boxes in a structured image more efficiently using a search strategy than contour detection because contour detection can produce a significant number of false positives or false negatives. For example, if the contour detection algorithm has not been adjusted specifically for a particular structured image, the contour detection may not be able to accurately depict the perimeter for a bounding box. A false positive, as referred to herein, corresponds to a region of a structured image that is inaccurately captured as a bounding box. A false negative, as referred to herein, corresponds to a region of a structured image that is not identified as a bounding box.

In some embodiments, the inference-rule based search strategy can use an expression and a bounding box, and recursively match the expression against regions within the bounding box. In some examples, the inference-rule based search strategy identifies bounding boxes based on an element description in an expression. The element description can describe a value of a cell or style characteristics associated with a cell within a bounding box. The inference-rule based search strategy can include parsing a structured image based on a hierarchical relationship between the cells of a structured image and the corresponding bounding boxes of a structured image. In some embodiments, an inference-rule based search strategy identifies bounding boxes based upon contours and inferences that follow from a description in an expression. An inference can include any suitable top-down matching rule or bottom-up matching rule, which are described in greater detail below.

At block 206, the parser module 120 can generate a tuple of structured data files based on the identified hierarchical arrangement of bounding boxes in the structured image. In some embodiments, the data file can include any suitable number of values or style characteristics corresponding to any suitable number of cells or regions of a structured image. In some examples, the data file can enable a structured image to be edited. For example, the structured image may represent a table or a bead design image, among others. An expression can be generated based on previous examples of structured images, or an expression can be obtained from a user. In one example, the expression can describe a structured image, such as a table, as a table header, a row of column headers, and a vertical sequence of table rows. In some examples, a table header can include text in a cell of unknown height that spans the width of the structured image. Each row of a table can include any suitable horizontal sequence of cells, where each cell can be a rectangle of an unknown background and unknown content with any type of border. The content of each cell, including headers, can be marked as data to be extracted. The parser module 120 can use an expression to parse the structured image into a single data file, while preserving the semantic alignment.

The process flow diagram of FIG. 2 is not intended to indicate that the steps of the method 200 are to be executed in any particular order, or that all of the steps of the method 200 are to be included in every case. Further, any number of additional steps may be included within the method 200, depending on the specific application. In some examples, the parser module 120 may use an expression tree to identify data within any suitable number of images and store the data from each image in a single data file. For example, the parser module 120 can generate a single data file that includes data from any number of files that match a particular expression or expression tree.

Figure 3:
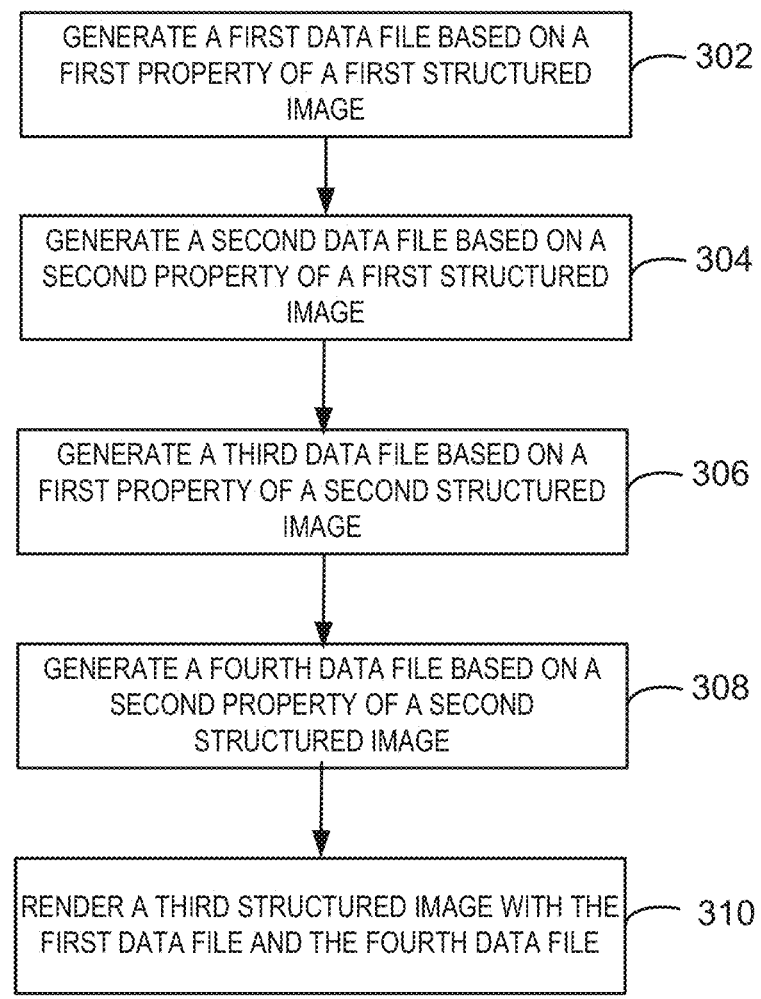
FIG. 3 is a process flow diagram of an example method for generating a new image based on two existing images.

FIG. 3 is a process flow diagram of an example method for generating a new image based on two existing images. The method 300 can be implemented with any suitable computing device, such as the computing device 100 of FIG. 1.

At block 302, the parser module 120 can generate a first data file based on certain properties, also referred to herein as P1, of the image extracted during the parsing process using an expression. The first data file can include values for any suitable number of cells or pixels of an image. For example, the first data file can include any suitable properties P1 such as content values of a cell or pixel of an image, among others. In some examples, the content values in the first data file may include data values from cells in a chart or a table, among others.

In one embodiment, the parser module 120 does not generate a data file by enumerating all possible bounding boxes in a structured image. Rather, the parser module 120 can search a structured image using descriptions from an expression with a top-down search strategy, which includes top-down inference rules, or a bottom-up search strategy that includes bottom-up inference rules. The top-down search strategy and bottom-up search strategy are discussed in greater detail below in relation to FIG. 6.

At block 304, the parser module 120 can generate a second data file based on additional properties, also referred to herein as P2, of the image extracted during the parsing process using an expression. For example, the second data file may include properties P2 that include the style characteristics of bounding boxes, such as the color of the bounding box, shape of the bounding box, or alignment of content within the bounding box. In some embodiments, the parser module 120 can generate the second data file with a data tree that corresponds to the expression tree and the data values in the first data file.

At block 306, the parser module 120 can generate a third data file comprising properties P1 of a second structured image using an expression. In some examples, the properties P1 of the second structured image can be detected using the same expression that detected the properties P1 in a first structured image. At block 308, the parser module 120 can generate a fourth data file comprising properties P2 of a second structured image using an expression. In some embodiments, the properties P2 of the second structured image can also be detected using an expression that detected the properties P2 in a first structured image.

At block 310, the render module 122 can render a third structured image from the first data file based on the first structured image and the fourth data file based on the second structured image. For example, rendering an image can include combining a data file with the content values (also referred to as property P1) inside bounding boxes from a first structured image and a data file with style characteristics (also referred to herein as property P2) related to bounding boxes from a second structured image.

The process flow diagram of FIG. 3 is not intended to indicate that the steps of the method 300 are to be executed in any particular order, or that all of the steps of the method 300 are to be included in every case. Further, any number of additional steps may be included within the method 300, depending on the specific application.

Figure 4:
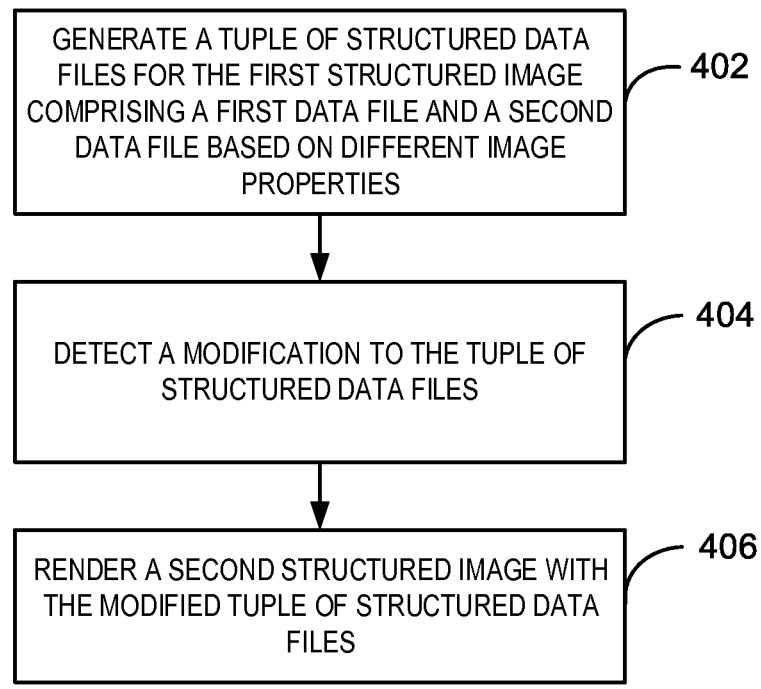
FIG. 4 is a process flow diagram of an example method for generating a new image based on a modified data file.

FIG. 4 is a process flow diagram of an example method for generating a new image based on a modified data file. The method 400 can be implemented with any suitable computing device, such as the computing device 100 of FIG. 1.

At block 402, the parser module 120 can generate a tuple of structured data files for the first structured image comprising a first data file and a second data file based on different image properties. In some embodiments, the first data file can be generated based on textual content such as content values inside various bounding boxes. As discussed above, the content values can include data values from cells in a chart or a table, among others. In some examples, the second data file can include style characteristics of the various bounding boxes such as color of the bounding box, shape of the bounding box, or alignment of content within the bounding box, among others.

At block 404, the parser module 120 can detect a modification to the tuple of structured data files. In some embodiments, the content values or the style characteristics included in the tuple of structured data files can be modified. For example, a first data file may include style characteristics that indicate the color of each cell in a structured image. In some example, the style characteristics can be modified to indicate a different color for each cell of the structured image. In some embodiments, a first data file may include content values that correspond to cells from a table. In some examples, the content values may be modified, so that a table rendered from the content values would include new content values.

At block 406, the render module 122 can render a second structured image with the modified tuple of structured data files. In some embodiments, the render module 122 can render a second structured image with a rendering operation that can reverse the parsing operation. For example, an image can be rendered from an expression tree and any suitable number of data files. In some embodiments, a rendering operation can map an expression and any suitable number of data files to a newly created image using property values from the data files. In some examples, the data files can be produced with a parsing operation and an appropriate expression. In one example, modifications can be made to any number of data files and/or an expression that produced the data files. Modifying the data files allows for image editing (by either changing the data files or the expression) and image creation (by mixing and matching data files that resulted from parsing of different images with the same expression).

In one example, a bead design can be modified. For example, the colors of the bead design can be replaced with a different set of colors. The bead design can be described using any suitable expression. In some embodiments, the bead design can include any suitable number of vertical sequences of rows and any suitable number of cells in each row. In some examples, each cell can be a different color and each sequence may have a constant gap between cells. Additionally, each cell may have a border of some fixed but unknown width and color.

The parser module 120 can use an expression that describes the bead design and produce a data file that includes the colors of each cell of the bead design. In some examples, the expression that describes the bead design can be modified so that a set of colors for cell backgrounds is restricted to a particular set of colors. In other examples, the expression that describes the bead design can include an increased gap between cells to accommodate for mosaic pieces with thicker edges. The render module 122 can then use the modified expression and the original set of data files to produce a new mosaic design.

The process flow diagram of FIG. 4 is not intended to indicate that the steps of the method 400 are to be executed in any particular order, or that all of the steps of the method 400 are to be included in every case. Further, any number of additional steps may be included within the method 400, depending on the specific application.

FIG. 5 is an example chart that can be described with a domain-specific language that manipulates structured images. In some embodiments, the chart can include a title 502, column headers 504, row headers 506, and cells of data

508. In some embodiments, the domain-specific language that describes the chart 500 can include an expression (also referred to herein as an element expression) that can be used to transform a structured image into a tuple of tree-shaped data files (the transformation also referred to herein as a parsing operation). In some embodiments, the domain-specific language can also include an element expression that can transform a tuple of tree-shaped data files into a structured image (also referred to herein as a rendering operation). In some examples, the element expression can identify any suitable number of regions or cells of a structured image. The element expression can also be recursively defined as a struct, sequence, union or leaf type, among others.

An example of an expression that represents the chart 500 is provided below prior to a description of one example of a domain-specific language that can describe a structured image.

Struct((Top, Elem(Descr(X:=0, Y:=0, Width:=$.Width, Height:=?), $E_1$)), (Head, Elem(Descr(X:=0, Y:=Top. Height, Width:=$.Width, Height:=?), $E_2$)), (Cells, Elem (Descr(X:=0, Width:=$.Width, Y:=Top. Height+ Head.Height, Height:=?), $E_3$))), where $E_1$=Elem(Descr(Content:=$_{out}$?), Rectangle), $E_2$=Elem(Descr(Gap:=*), HSeq(?, $E_1$)), $E_3$=Elem(Descr(Gap:=*), VSeq(?, $E_2$))

In some examples, a structure expression can represent a constructor Struct (<$S_1$, $E_{v,1}$>, ..., <$S_m$, $E_{v,m}$>). A constructor, struct, can include any suitable number of subexpressions $E_{v,1}$, ..., $E_{v,m}$, which can be referred to as symbols of the structure. Each symbol $E_{v,j}$ can be marked with a corresponding symbol name $S_j$. In some examples, symbol names can be referred to in property descriptions such as a PropGet constructor. In some embodiments, a symbol "$" can represent a structure. By default, an element may be assumed to occupy the space of the parent's bounding box, if no alignment properties have been provided in an expression.

A union expression U can be represented as a constructor such as Choice($E_{v,1}$, ..., $E_{v,m}$). The union expression can include any suitable number of subexpressions or alternative choices such as $E_{v,1}$, ..., $E_{v,m}$. The parsing operation can attempt to parse a structured image with each of the subexpressions in the union expression. In some examples, the first subexpression that matches a bounding box within the structured image can be identified as the value for the union expression.

In some examples, a description "Descr" is a set of property assignments, which can specify values for various properties. The set of available property names can depend on the type of an element being described. In some embodiments, there are two property categories: alignment properties and data properties. The alignment properties can describe the location of an element within a structured image with terms such as X, Y, Width, Height, Center X, Center Y, Radius, and Gap, among others. The data properties can describe style characteristics of the element using terms such as Content, Color, Background, Border, and Border Width, among others.

In some embodiments, a property assignment may be tagged with a tag name. In some examples, tagged property assignments can be represented with a constructor, such as a TaggedAssign ($v_j$, s, p) constructor. In one example, a non-tagged property assignment can be represented with a constructor, such as an Assign (s, p) constructor. In this example, the property name p can be the assigned property expression, and $v_j$ can be an optional tag name. The TaggedAssign ($v_j$, s, p) constructor indicates that the evaluated value of p is to be saved in a corresponding output data file during the parsing operation for each parsed instance of the TaggedAssign assignment.

Data files are an output of the parsing operation, and are a part of an input for the rendering operation. The data files can include values for tagged property assignments in an expression. A data file can include a tree whose nodes contain mappings from expression properties or attributes or field-names to their corresponding content values. In some examples, the shape of the tree in a data file produced from parsing an image with an expression can be the same shape of an expression tree used to parse the image.

In some embodiments, arithmetic calculations are included in property expressions, constant constructors, and enumerated constructors. An enumerated constructor enables an expression to detect a set of possible values for a property. In some examples, the parsing operation indicates a matching cell from an image when the corresponding property value for the cell from the image belongs to the set of possible property values in the enumerated constructor.

In some examples, unknown properties are represented with symbols, such as "?" or "*". In one example, the symbol "?" can denote an unknown variable, while the symbol "*" can denote an unknown constant that is determined at run-time. A sequence expression S can be represented with a constructor such as Seq (O, C, $E_v$). In one example, a sequence can include any suitable number of subexpressions of the same type as $E_v$. The subexpressions can include any expression in an expression tree and the subexpressions can indicate that rows in an image are aligned according to a particular orientation O, which may be either horizontal or vertical.

In some embodiments, the constructor Seq(Horizontal, C, $E_v$) can be depicted as HSeq(C, $E_v$), and the constructor Seq(Vertical, C, $E_v$) can be depicted as VSeq(C, $E_v$). In some examples, the number of elements in a sequence can be specified via a count expression variable C. In one example, the value of the count expression can be set with a constant constructor, an unknown variable, or a range constructor that provides a range of possible values. In some embodiments, the parsing operation can determine the number of cells in a sequence within a structured image. In one example, the number of cells in a sequence can be stored as a count property in a data file. In some examples, the count constructor Const(k) can be depicted as "K." If a certain property in a description of an expression tree or an expression is assigned an unknown variable, the value of the unknown variable can be determined at run-time of the parsing operation. In some embodiments, a sequence may indicate gaps between cells of a structured image with a term, such as "Gap" in a description of an expression.

Leaves can represent the smallest divisible portion of a structured image. In some examples, leaves can include values associated with a rectangular shape or a circular shape, among others. In some examples, a bounding box can include a rectangular region or leaves of an image. In one example, a bounding box matches a description of an expression if the image properties within the bounding box match the corresponding image properties of the description of the expression. In some embodiments, a region or bounding box of an image can include an interior boundary of pixels or an exterior boundary of pixels that include one color. In other words, there may not be two different colors within a particular number of pixels inside of a bounding box's border, or there may not be two different colors within a particular number of pixels outside of a bounding box's border.

In some embodiments, a region or bounding box in a structured image can include pixels of one particular color. In some examples, a border of a region or bounding box may include various different colors. In one example, a border of a bounding box with various colors can indicate that an object crosses the border of the bounding box, so the bounding box may not be considered as a separate object. For example, a table may include black and white text of various mathematical expressions. If a bounding box is identified with both black and white pixels within the boundary, the parser module 120 may detect that the boundary crosses a mathematical expression. In some embodiments, the number of potential bounding boxes in an image may not exceed the number of detected contours in an image, and the number of bounding boxes identified by the inference rules.

FIG. 6 illustrates an example of top-down inference rules and bottom-up inference rules. In some embodiments, the top-down inference rules and the bottom-up inference rules can be implemented with a parser module such as the parser module 120 of FIG. 1.

In some embodiments, the parsing operation can accept an expression $E_v$ and an image I and parse the image I into a tree of bounding boxes, which includes property values for tagged property assignments that can be stored in any suitable number of data files $d_1, \ldots, d_n$. In some examples, the parsing operation can identify a hierarchical arrangement of bounding boxes that match an expression. In some embodiments the bounding boxes are identified with image processing techniques such as contour detection. Contour detection is a method of recognizing closed regions with notable edges from an image. As discussed above, the edge of such a region, which forms a closed polyline, is called a contour. In some embodiments, the parsing operation includes searching the identified contours for bounding boxes by attempting to match an expression against each identified contour. However, contour detection may produce a significant number of false positives or false negatives, if the contour detection algorithm has not been adjusted for a particular image type. In some examples, a contour may be considered close to a bounding box b if the area of the symmetric difference between the contour and the bounding box does not exceed a percent of the image size.

In some embodiments, the parsing operation identifies bounding boxes with inference rules and a dynamic programming based search strategy. The inference rules can include top-down inference rules and bottom-up inference rules. The dynamic programming based search strategy can address inefficiency issues that may result from a large number of false positives or the inability to identify which contour corresponds to a particular expression.

In some embodiments, top-down inference rules implement a top-down parsing approach. The top-down inference rules can accept any expression as input and perform a recursive parsing of an image using the expression. The top-down inference rules can identify bounding boxes that match an expression based upon identified contours and descriptive information in the expression. In some examples, top-down inference rules cannot match particular elements of an image to an expression if the bounding boxes include false negatives. In FIG. 6, top-down inference rules are marked as "TD". The top-down matching procedure TDMatch($E_v$, b) 602 accepts an expression $E_v$ and a bounding box b as input, and recursively matches the expression against the bounding box. If the top-down matching procedure TDMatch 602 succeeds (i.e., TDMatch 602 identifies a hierarchical arrangement of bounding boxes inside b that matches the expression $E_v$), TDMatch 602 returns a tuple of data files $d_{v1}, \ldots, d_{vn}$ (denoted as T in FIG. 6). In some examples, the tuple of data files can be stored in global cache M. The tuple of data files can be filled with property values that correspond to cells of an image within the bounding box b. In one example, the function Fill(D, b, T) 604 can accept a tuple T of data files and return the tuple of data files along with values found in a bounding box for tagged property assignments in a description D. If the bounding box b does not match any of the descriptions in the expression $E_v$, the procedure can return a false signal. In some examples, the top-down matching procedure TDMatch 602 can return a maybe signal if there is not enough information in the expression $E_v$ to determine that a bounding box b matches the expression $E_v$.

In some embodiments, the top-down matching procedure TDMatch 602 can recursively invoke additional top-down inference rules. In some examples, a top-down matching procedure can detect whether there has been an execution of a given top-down matching procedure with the same parameters, such as a bounding box and an expression, and a successful result. If the top-down matching procedure detects the execution of the same top-down matching procedure with the same parameters, the result from the previous execution of the top-down matching procedure can be returned.

In FIG. 6, if a top-down inference rule includes execution of a top-down matching procedure TDMatch 602 below the horizontal line, then if the conditions above the line are true, then the match is successful, and its result is shown below the line after the "=" sign. The TD-RECT-INCOMPLETE rule 606 states that if the description D of a rectangular leaf is incomplete, (i.e., the attributes of the rectangular leaf such as border and color are not specified) and there exists a contour c close to a bounding box b that matches a description D, then a successful match for a leaf can be filled from the contour c's bounding box. The TD-RECT-COMPLETE rule 608 is invoked for rectangular leaves with complete descriptions, and fills a successful match from a given bounding box. We use off-the-shelf Tesseract OCR engine for parsing "Content" property in leaf elements. The TD-STRUCT rule 610 states that if every symbol $<S_i, E_i>$ of a struct expression matches some bounding box $b_i$, then the entire struct matches the smallest bounding box enclosing all $b_i$. A symbol $<S_i, E_i>$ is successfully matched against a bounding box b if there exists a matching contour for this symbol (TDSYMBOL-CONTOUR rule 612) or if b was calculated from the other successfully matched symbols using relative properties, and successfully matched recursively (TD-SYMBOL-DEPEND rule 614). The TD-SEQ-RANGE rule 616 states that a sequence with a Range(k1, k2) count expression is successfully matched against a bounding box b, if there exists k1≤k≤k2 such that b can be split into k parts according to the sequence's orientation, and the sequence's element type is matched successfully against each part.

In some embodiments, a parser module can implement a parsing operation that alternates between top-down parsing and bottom-up parsing to form a meet-in-the-middle dynamic programming technique. In some examples, bottom-up parsing can invoke top-down inference rules. If top-down parsing does not identify a region of a structured image that matches an expression, the parser module can execute bottom-up parsing techniques. In some examples, a bottom-up parsing technique can include matching expressions in an expression tree against previously identified contours.

Bottom-up parsing can also include using inference rules to detect matches for any suitable number of facts in a cache. A fact, as referred to herein, can include a region of an image that matches a bounding box. If the bottom-up parsing technique identifies a region of an image that matches an expression, then the new match for the expression tree can be stored in a cache M along with the corresponding bounding box. In some examples, bounding boxes can be identified from contours or suggested by the inference rules.

Bottom-up inference rules (identified as BU in FIG. 6) implement a bottom-up parsing approach, which can identify regions of an image that match an expression despite false negative bounding boxes. The bottom-up parsing can include matching identified contours with leaf elements. The bottom-up parsing can also include generating a guess about a bounding box in the expression tree, if a subexpression of an expression tree matches a bounding box. The bottom-up matching procedure BUMatch can be executed when any matching bounding box is identified. In some embodiments, BUMatch includes applying bottom-up inference rules such as 620 and 624. In one example, BUMatch invokes a corresponding bottom-up inference rule. The bottom-up inference rule BUMatch can accept an expression $E_v$ and a bounding box b, and identify a match for a parent expression of $E_v$ in the expression tree. The bottom-up inference rule BUMatch can also invoke some top-down inference rules and check hypotheses in order to find a new match. In some embodiments, bottom-up inference rules can be defined for each expression type, except for leaves.

The bottom-up inference rules can also identify expressions that indicate bounding boxes within an image. For example, if there appears to be a new match in the cache M, shown as Fact(E, b, F) 618, and some conditions above the horizontal line are true, then the new Fact below the line is established. In some embodiments, the horizontal line indicates the inference rule above the horizontal line is an antecedent to a hypothetical proposition and the inference rule below the horizontal line is a consequent to the hypothetical proposition. For example, the horizontal line can indicate an "if-then" relationship between two inference rules. The conditions above the line can invoke other inference rules and bind new variables. For example, the BU-SEQ-UNKNOWN inference rule 620 states that if some element of a sequence was successfully matched against a bounding box b, and the sequence's count expression is unknown (indicated by "?" or "*"), then the bottom-up inference rule can copy b in multiple directions (i.e. left and right for horizontal orientation, or above and below for vertical orientation) as far as possible, assuming that each element of the sequence has the same size, or can be determined explicitly by some contour. The bottom-up inference rule results in a bounding box that matches an expression if sequence elements match a copied bounding box or a contour.

In some embodiments, the parsing and rendering algorithms described above can be simulated using any suitable programming language, such as C#, among others. In some examples, contour detection can be implemented with any suitable algorithm, such as Suzuki's algorithm, among others. Furthermore, an OCR engine can be implemented through any suitable technique such as Tesseract, among others. In some embodiments, the techniques described herein do not use any pre-existing semantic knowledge in order to parse a structured image. Rather, the techniques described herein can parse a structured image using information such as a description of a structured image in the programming language described above, among others. In some examples, the programming language can be used to define which regions of a structured image include data that is to be extracted.

The diagram of FIG. 6 is not intended to indicate that the diagram comprises all of the inference rules. Rather, additional inference rules can exist. For example, the TD-Union 622, BU-Union 624, and TD-SEQ-Const inference rules 626 can be used to identify regions of a structured image that match an expression.

Figure 7:
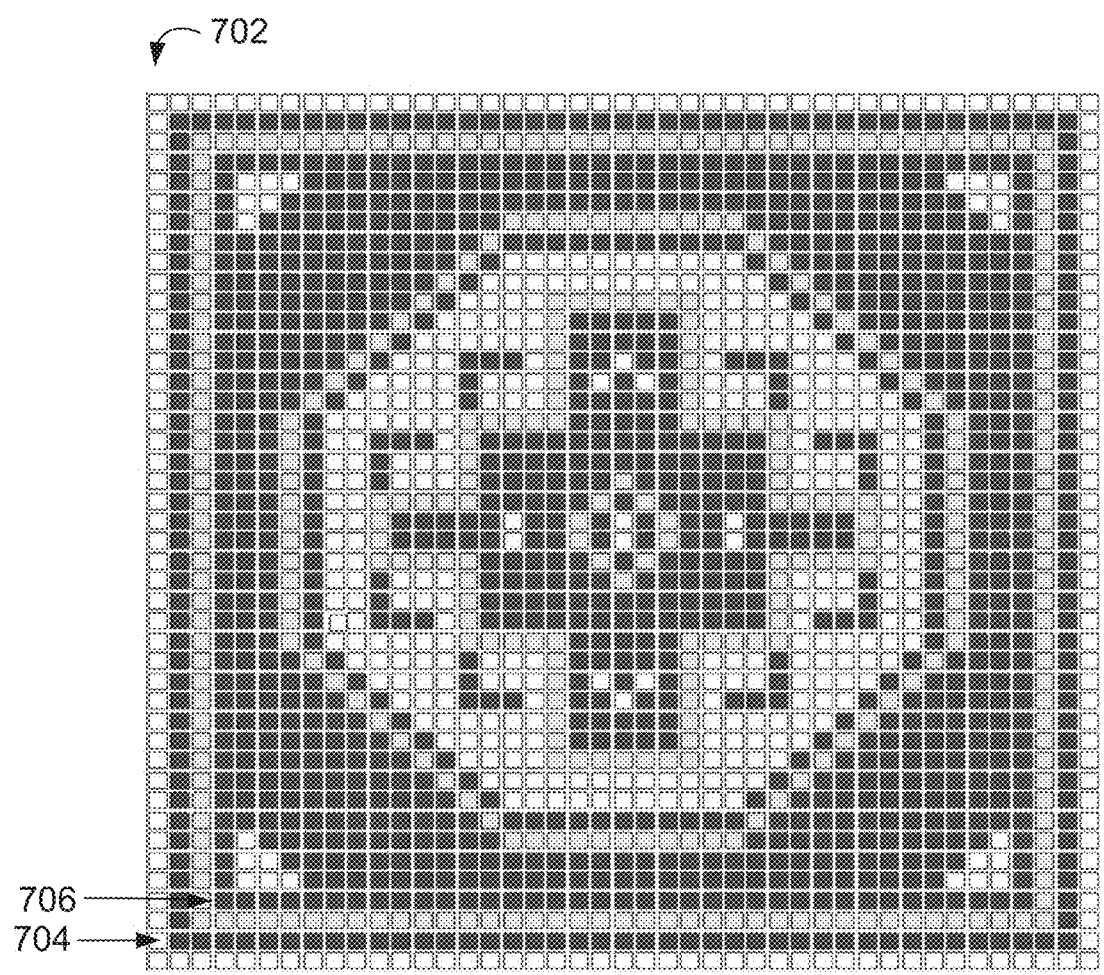
FIG. 7 is an illustration of an example bead diagram that can be described with an expression using a constructor.

FIG. 7 is an illustration of an example bead diagram that can be described with an expression using a constructor. In some embodiments, the bead diagram can include any suitable number of rows and columns of cells. In some examples, each cell can have any suitable number of characteristics, such as color, shape, and size, among others.

The bead diagram 700 includes a number of rectangular cells 702. The cells 702 of bead diagram 700 are illustrated in two different colors, black and white. As discussed above, a parser module 120 can detect patterns of the cells with the help of an expression that describes the bead diagram 700. In some embodiments, the expression can be an expression tree that includes child expressions and parent expressions. A parent expression may indicate a pattern within a structured image, such as bead diagram 700, that includes a larger number of cells. A child expression may indicate a pattern within a structured image, such as bead diagram 700, that includes a smaller number of cells. For example, the pattern 704 that includes a horizontal collection of cells is a parent expression whose child expression includes pattern 706 that matches a single cell. In some embodiments, the expression tree can indicate the patterns of a structured image, such as bead diagram 700, with child expressions and parent expressions that correspond to the hierarchical arrangement of patterns of cells.

Figure 8:
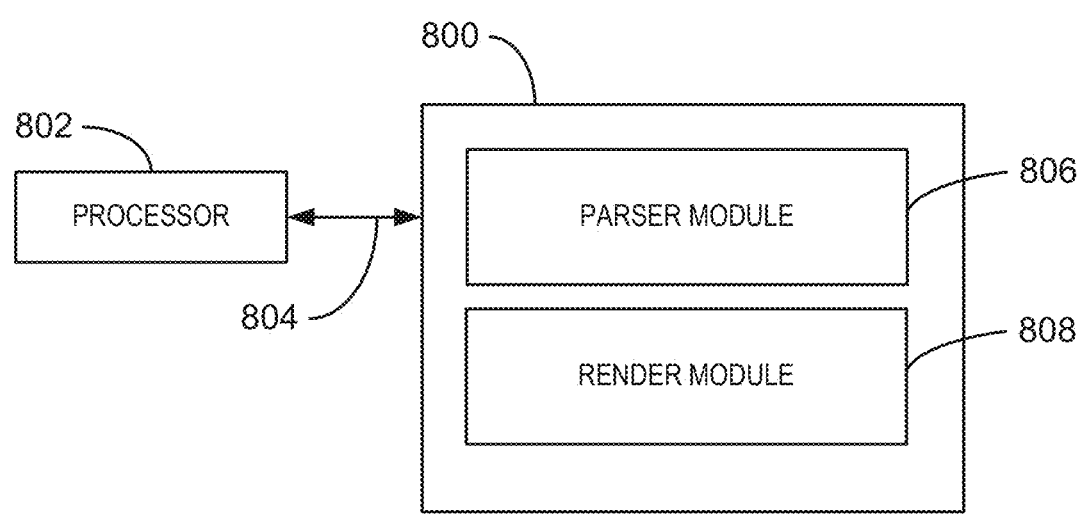
FIG. 8 is a block diagram showing a tangible, computer-readable storage media that parses and renders structured images.

FIG. 8 is a block diagram showing a tangible, computer-readable storage media 800 that parses and renders structured images. The tangible, computer-readable storage media 800 may be accessed by a processor 802 over a computer bus 804. Furthermore, the tangible, computer-readable storage media 800 may include code to direct the processor 802 to perform the steps of the current method.

The various software components discussed herein may be stored on the tangible, computer-readable storage media 800, as indicated in FIG. 8. For example, the tangible computer-readable storage media 800 can include a parser module 806 and a render module 808. In some embodiments, the parser module 806 can generate a set of data files from a structured image using an expression. The render module 808 can generate a structured image using any suitable number of expressions or expression trees and any suitable number of data files.

It is to be understood that any number of additional software components not shown in FIG. 8 may be included within the tangible, computer-readable storage media 800, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

What is claimed is:

1. A method for generating a tuple of structured data files comprising:
   detecting an expression that describes a structure of a structured image;
   using an inference-rule based search strategy to identify a hierarchical arrangement of bounding boxes in the structured image that match the expression; and
   generating a first tuple of structured data files based on the identified hierarchical arrangement of bounding boxes in the structured image.

2. The method of claim 1, wherein the inference-rule based search strategy comprises using both a top-down inference rule and a bottom-up inference rule.

3. The method of claim 1, wherein the inference-rule based search strategy comprises identifying the bounding boxes by detecting a contour within the structured image using image processing techniques.

4. The method of claim 1, wherein the first tuple of structured data files comprises a first data file of content values and a second data file of style characteristic related to the content values.

5. The method of claim 4 comprising:
generating a second tuple of data files for a second structured image based on the expression, wherein the second tuple of data files comprises a third data file of content values and a fourth data file of style characteristics related to the content values;
rendering a third structured image from the first data file based on the first structured image and the fourth data file based on the second structured image.

6. The method of claim 1 comprising:
detecting a modification to the first tuple of structured data files; and
rendering a second structured image with the modified first tuple of structured data files.

7. The method of claim 2 wherein the expression is an expression tree that is generated based on a set of example structured images.

8. The method of claim 7 wherein the top-down inference rule can identify the bounding boxes, wherein the bounding boxes comprise a first bounding box and a second bounding box that match at least two child expressions in the expression tree, given a third bounding box that matches a parent expression in the expression tree.

9. The method of claim 7 wherein the bottom-up inference rule can identify the bounding boxes, wherein the bounding boxes comprise a first bounding box that matches a parent expression in the expression tree, given a second bounding box and a third bounding box that match at least two child expressions in the expression tree.

10. One or more computer-readable storage media for generating a tuple of structured data files comprising a plurality of instructions that, when executed by a processor, cause the processor to:
detect an expression that describes a structure of a structured image using a constructor;
use an inference-rule based search strategy to identify a hierarchical arrangement of bounding boxes in the structured image that match the expression; and
generate a first tuple of structured data files based on the identified hierarchical arrangement of bounding boxes in the structured image, wherein the first tuple of structured data files comprises a first data file of content values and a second data file of style characteristic related to the content values.

11. The one or more computer-readable storage media of claim 10, wherein the inference-rule based search strategy comprises using both a top-down inference rule and a bottom-up inference rule.

12. The one or more computer-readable storage media of claim 10, wherein the inference-rule based search strategy comprises identifying the bounding boxes by detecting a contour within the first structured image using image processing techniques.

13. The one or more computer-readable storage media of claim 10, wherein the instructions cause the processor to:
generate a second tuple of data files for a second structured image based on the expression, wherein the second tuple of data files comprises a third data file of content values and a fourth data file of style characteristics related to the content values; and
render a third structured image from the first data file based on the first structured image and the fourth data file based on the second structured image.

14. The one or more computer-readable storage media of claim 9, wherein the instructions cause the processor to:
detect a modification to the first tuple of structured data files; and
render a second structured image with the modified first tuple of structured data files.

15. A system for generating a data file comprising:
a processor to execute processor executable code;
a storage device that stores processor executable code, wherein the processor executable code, when executed by the processor, causes the processor to:
detect an expression that describes a structure of a structured image using a constructor;
use an inference-rule based search strategy to identify a hierarchical arrangement of bounding boxes in the structured image that match the expression; and
generate a first tuple of structured data files based on the identified hierarchical arrangement of bounding boxes in the structured image, wherein the first tuple of structured data files comprises a first data file of content values and a second data file of style characteristic related to the content values.

16. The system of claim 15, wherein the inference-rule based search strategy comprises identifying the bounding boxes by detecting a contour within the first structured image using image processing techniques.

17. The system of claim 15, wherein the processor is to:
generate a second tuple of data files for a second structured image based on the expression, wherein the second tuple of data files comprises a third data file of content values and a fourth data file of style characteristics related to the content values; and
render a third structured image from the first data file based on the first structured image and the fourth data file based on the second structured image.

18. The system of claim 15, wherein the processor is to:
detect a modification to the first tuple of structured data files; and
render a second structured image with the modified first tuple of structured data files.

19. The system of claim 15, wherein the expression is an expression tree that is generated based on a set of example structured images.

20. The system of claim 19, wherein the inference-rule based search strategy uses a top-down inference rule that can identify the bounding boxes, wherein the bounding boxes comprise a first bounding box and a second bounding box that match at least two child expressions in the expression tree, given a third bounding box that matches a parent expression in the expression tree.

* * * * *